(12) United States Patent
Xiong et al.

(10) Patent No.: US 9,064,224 B2
(45) Date of Patent: Jun. 23, 2015

(54) PROCESS DRIVEN BUSINESS INTELLIGENCE

(75) Inventors: Wuzhen Xiong, Shanghai (CN); Mingjian Hu, Shanghai (CN); Xu Chen, Yangzhou (CN); MingZhe Huang, Shanghai (CN); Jianzhuo Shi, Shanghai (CN)

(73) Assignee: BUSINESS OBJECTS SOFTWARE LIMITED (IE)

( * ) Notice: Subject to any disclaimer, the term of this patent is extended or adjusted under 35 U.S.C. 154(b) by 248 days.

(21) Appl. No.: 12/912,787

(22) Filed: Oct. 27, 2010

(65) Prior Publication Data

US 2012/0095956 A1    Apr. 19, 2012

(30) Foreign Application Priority Data

Oct. 15, 2010   (CN) .......................... 2010 1 0507873

(51) Int. Cl.
  *G06F 17/30* (2006.01)
  *G06Q 10/06* (2012.01)
  *G06Q 10/10* (2012.01)

(52) U.S. Cl.
  CPC ........ *G06Q 10/067* (2013.01); *G06F 17/30592* (2013.01); *G06Q 10/10* (2013.01)

(58) Field of Classification Search
  CPC . G06F 17/30592; G06Q 10/067; G06Q 10/10

USPC .......................................... 707/600, 602, 603
See application file for complete search history.

(56) References Cited

U.S. PATENT DOCUMENTS

| | | | |
|---|---|---|---|
| 7,139,757 B1 * | 11/2006 | Apollonsky et al. | 1/1 |
| 2002/0103789 A1 * | 8/2002 | Turnbull et al. | 707/3 |
| 2004/0143777 A1 * | 7/2004 | Arend | 714/26 |
| 2005/0108631 A1 * | 5/2005 | Amorin et al. | 715/513 |
| 2005/0197990 A1 * | 9/2005 | Wu et al. | 706/48 |
| 2005/0262087 A1 * | 11/2005 | Wu et al. | 707/9 |
| 2007/0299853 A1 * | 12/2007 | Knotz et al. | 707/10 |
| 2008/0077609 A1 * | 3/2008 | Ronen | 707/102 |
| 2008/0082493 A1 * | 4/2008 | Polo-Malouvier et al. | 707/3 |
| 2008/0162209 A1 * | 7/2008 | Gu et al. | 705/7 |
| 2008/0312963 A1 * | 12/2008 | Reiner | 705/2 |
| 2009/0112832 A1 * | 4/2009 | Kandogan et al. | 707/4 |
| 2010/0057677 A1 * | 3/2010 | Rapp et al. | 707/3 |
| 2010/0094858 A1 * | 4/2010 | Indeck et al. | 707/706 |

* cited by examiner

*Primary Examiner* — Jorge A Casanova
(74) *Attorney, Agent, or Firm* — Horizon IP Pte. Ltd.

(57) ABSTRACT

Described herein is a technology for facilitating process driven business intelligence. In one implementation, context data generated by a business process tool is received. One or more relevant application programming interfaces (APIs) are identified by matching the APIs with the current attribute associated with the context data. The APIs are executable by a processor to retrieve source data from an information source and provide business intelligence based on the source data.

20 Claims, 14 Drawing Sheets

Exemplary input:
1. R = {"List production plan", "List leave requests", "List employee salaries", "List department employees"}
   A1 = {DEPARTMENT, TIMEFRAME}
   A2 = {USER_ID, TIMEFRAME, LEVEL}
   A3 = {USER_ID, TIMEFRAME}
   A4 = {DEPARTMENT, YEAR}

2. B = {USER_ID, DEPARTMENT, TIMEFRAME, POSITION}

Exemplary output:
M = {"List production plan," "List employee salaries"}

Fig. 6b

Exemplary input:

1. R = {"List production plan", "List leave requests", "List employee salaries", "List department employees"}
   A1 = {DEPARTMENT, TIMEFRAME}
   A2 = {USER_ID, TIMEFRAME, LEVEL}
   A3 = {USER_ID, TIMEFRAME}
   A4 = {DEPARTMENT, YEAR}

2. B = {USER_ID, DEPARTMENT, TIMEFRAME, POSITION}

3. D = Dictionary of Aliases                        ⌐705

| Key | Aliases |
   |---|---|
   | USER_ID | ID, Identity, USER_NUMBER, EMPLOYEE_ID |
   | DEPARTMENT | TEAM, GROUP, UNIT |
   | TIMEFRAME | TIME_PERIOD, DATE_PERIOD |

⌐704

Exemplary output data:

M = {"List production plan," "List employee salaries"}

Exemplary input data:

1. M = {"List production plan", "List leave requests", "List employee salaries"}
   A1 = {DEPARTMENT, TIMEFRAME}
   A2 = {USER_ID, TIMEFRAME, LEVEL}
   A3 = {USER_ID, TIMEFRAME}

2. C is the score of specificity

⌐ 904

Exemplary output data:

S = Score Set  ⌐ 905

| Report Source | Score |
|---|---|
| List production plan | 2*C |
| List leave requests | 3*C |
| List employee salaries | 2*C |

Order Result
List leave requests
List production plan
List employee salaries

Current Context Attributes:

| Attribute Names | Attribute Values |
|---|---|
| USER_ID | 100001 |
| DEPARTMENT | Shanghai Sales Office |
| TIMEFRAME | September 24, 2009 |
| POSITION | Manager |

―1002

Report Source Data API = "List production plan"

| Input Parameter Name | Suggested Values |
|---|---|
| DEPARTMENT | Beijing Sales Office, China Office |
| TIMEFRAME | 2009 Q3 |

―1006

Report Source Data API = "List leave requests"

| Input Parameter Name | Suggested Values |
|---|---|
| User_ID | 100001 |
| TIMEFRAME | 2009 Q3 |
| LEVEL | Manager |

―1010

Report Source Data API = "List employee salaries"

| Input Parameter Name | Suggested Values |
|---|---|
| USER_ID | 100001 |
| TIMEFRAME | 2009 Q3 |

―1016

Fig. 10

PROCESS DRIVEN BUSINESS INTELLIGENCE

TECHNICAL FIELD

The present disclosure relates generally to business intelligence, and more particularly, to facilitating process driven business intelligence.

BACKGROUND

In the present business environment, corporations are demanding more real time information to make sound and time-critical business decisions. Business Intelligence (BI) has been used to support and improve such business enterprise decision making. BI tools are commonly applied to business data, such as sales revenue, costs, income, or other financial data. These tools are designed to spot, retrieve and analyze business data and to provide various historical, current and predictive future views of business operations. Common functions of BI tools include reporting, data exploration, data mining, data cleansing, information management, and business performance management.

In particular, reporting is a common function of BI tools. A report typically refers to information that is automatically retrieved from an information source (e.g., data warehouse, database, repository, etc.) and formatted according to a predefined schema. A report is a powerful way to present information. It facilitates compilation of massive amounts of data and monitoring of various enterprise operations. In addition, reports may be used to support the enterprise decision-making process in many areas, such as in sales, marketing, management, budgeting or forecasting.

There are, however, some limitations in present BI systems. One limitation is the complexity of the available tools and environment used for designing professional reports. Such tools require expert knowledge and are often too complex for a typical business user to learn. This often leads to lower productivity in developing reports and incomplete capturing of valuable data in the resulting report.

Another problem is the lack of integration of BI systems with the business process. For example, a user may be using an enterprise resource planning (ERP) software to perform work tasks or manage resources. While doing so, he may wish to view certain reports that can be generated by the BI tools to facilitate his work process. However, such BI tools are typically not integrated with the ERP software or the business process. More importantly, the source data retrievable by BI tools is typically not from the same information source as the source data retrievable by ERP software. Moreover, the relationship between the two types of source data is typically not defined. In order to view such reports, the user must switch from the ERP software to another different application to activate the BI tools. This causes much inconvenience and isolates the business process from the business intelligence platform.

Yet another limitation is the passive nature of the search and knowledge retrieval process in conventional BI systems. Ideally, users should be experienced with the creation and content of existing reports, so that they can easily find the report relevant to their work task. However, in current systems, users have to manually select the relevant report from a long list presented to them. As a result, work productivity and efficiency are typically impaired.

Accordingly, there is a need to provide an improved business intelligence platform that is more automated and integrated with the business process.

SUMMARY

A technology for process driven business intelligence is described herein. In one implementation, context data generated by a business process tool is received. One or more relevant application programming interfaces (APIs) are identified by matching the APIs with the current attribute associated with the context data. The APIs are executable by a processor to retrieve source data from an information source and provide business intelligence based on the source data.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Some embodiments are illustrated in the accompanying figures, in which like reference numerals designate like parts, and wherein:

FIG. 6b shows examples of input and output data generated by a name matching method;

FIG. 7b shows examples of input and output data generated by an alias matching method;

FIG. 9b shows examples of input and output data generated by a system-defined ranking method; and FIG. 9c shows an exemplary order list; and FIG. 10 shows exemplary current context attributes and parameter values suggested for respective report source data APIs.

DETAILED DESCRIPTION

Figure 1:
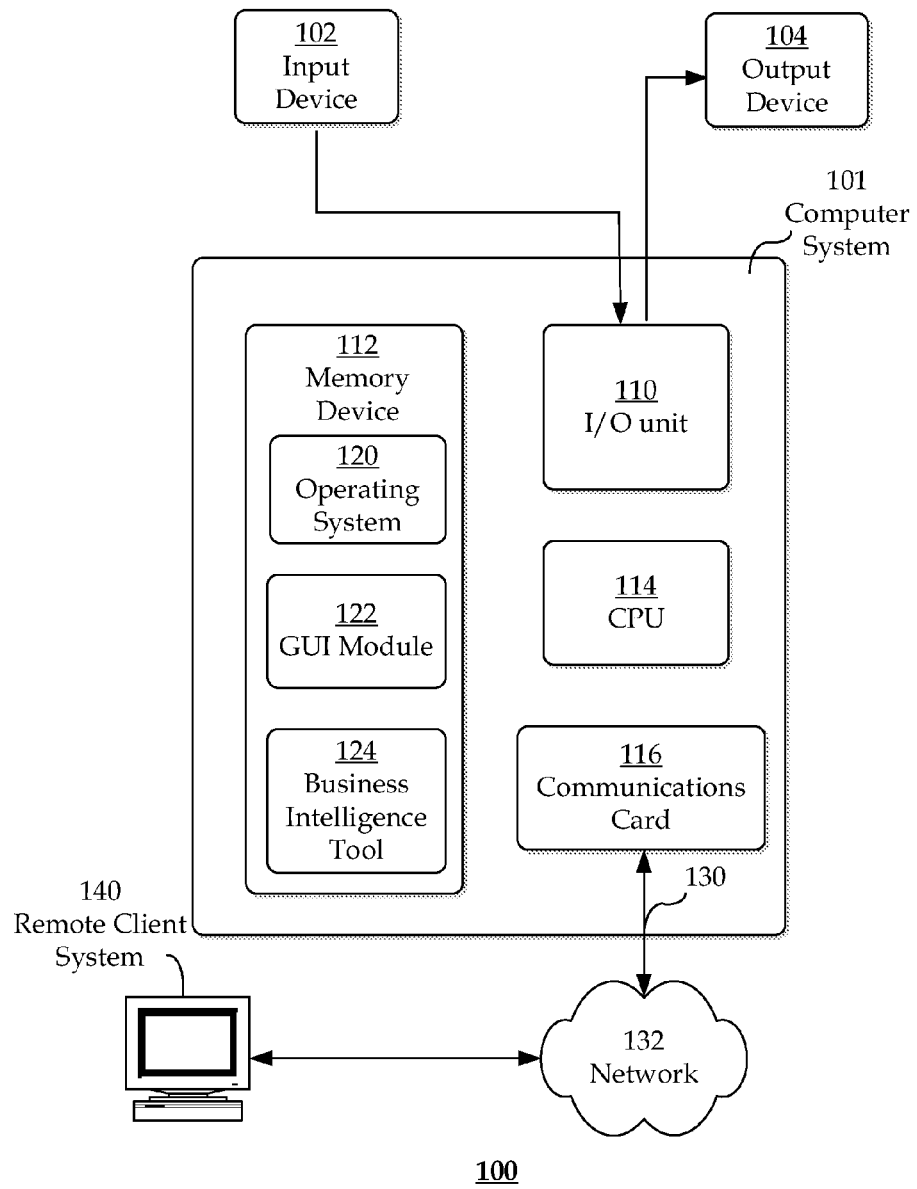
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

A framework for facilitating process driven business intelligence is described herein. One aspect of the present framework advantageously provides seamless integration of business process and business intelligence (BI) tools. The business intelligence tool is driven by the current attributes generated by the business process. Another aspect of the present framework enables the retrieval of business intelligence information from disparate sources of data. For example, the present framework may enable a user reviewing a sales order via a business process platform to view a report generated by the business intelligence tool with information retrieved from a financial news website. Yet another advantageous aspect of the present framework identifies and provides suggestions to users of business intelligence application programming interfaces (APIs) based on context data generated by the business process.

Business process tools generally refer to software tools that support business enterprise functions, workflow, management or planning. Such business process tools include, but are not limited to, enterprise resource planning (ERP) applications, such as the SAP Business Suite, SAP GRC, SAP BusinessOne, etc. Business intelligence tools are software tools used to improve business enterprise decision-making. These tools are commonly applied to financial, human resource, marketing, sales, customer and supplier analyses. More particularly, these tools can include, but are not limited to, reporting and analysis tools for information presentation, content delivery infrastructure systems for delivery and management of reports and analytics, data warehousing systems for cleansing and consolidating information from disparate sources, and data management systems, such as relational databases or Online Analytical Processing (OLAP) systems used to collect, store, and manage raw data. Exemplary BI applications that are commercially available include SAP BusinessObjects GRC, SAP Crystal Reports and Xcelsius. It is understood that the present framework may be embodied in other types of business intelligence applications that are operable to retrieve information from other information sources and to present information so as to facilitate decision-making in the business process.

The framework described herein may be implemented as a method, computer-controlled apparatus, a computer process, a computing system, or as an article of manufacture such as a computer-readable medium. These and various other features will be apparent from the following description.

Exemplary System

FIG. 1 is a block diagram illustrating an exemplary system 100 that implements the framework described herein. The system 100 includes one or more computer systems 101, with FIG. 1 illustrating one computer system 101 for purposes of illustration only.

Turning to the computer system 101 in more detail, it may include a central processing unit (CPU) 114, an input/output (I/O) unit 110, and a memory device 112. Memory device 112 stores machine-executable instructions, data, and various programs, such as an operating system 120, a graphical user interface (GUI) module 122 and a business intelligence tool 124, all of which may be processed by CPU 114. As such, the computer system 101 is a general-purpose computer system that becomes a specific purpose computer system when executing the machine-executable instructions. Alternatively, the technology described herein may be implemented as part of a software product, which is executed via the operating system 120. It should be noted that the various components (120, 122, 124) may be hosted in whole or in part by different computer systems in some implementations. Thus, the techniques described herein may occur locally on the computer system 101, or may occur in other computer systems and be reported to computer system 101. Although the environment is illustrated with one computer system, it is understood that more than one computer system or server, such as a server pool, as well as computers other than servers, may be employed.

In addition, each program may be implemented in a high-level procedural or object-oriented programming language, or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

The GUI module 122 comprises machine-executable instructions to generate graphical components of a user interface. It is understood that the user interface may also comprise non-graphical or textual components. For example, exemplary windows, icons, buttons, menus or the like, may be generated, as will be discussed later. The user interface may further include instructions to receive input from an input device 102 and display the graphical components on an output device 104.

The business intelligence tool 124 comprises tangibly encoded machine-executable instructions to perform intelligence-related functions on computer system 101, client system 140, or across network 132. Intelligence-related functions refer to functions that are operable, via an interface, to retrieve and analyze data from various information sources. Such intelligence-related functions include, but are not limited to, business intelligence (BI) functions such as generating reports (locally or on a server), viewing a report, performing query and analysis, mining data, cleansing data, performing Online Analytical Processing (OLAP), managing business performance, presenting information via a dashboard and so forth. In one implementation, the business intelligence tool 124 includes a suggestion engine and a report generator, as will be described with reference to FIG. 2. It should be understood that the components (120, 122, 124) stored in memory device 112 are merely exemplary and additional modules or sub-modules may also be provided. In addition, the functions of the components (120, 122, 124) may be combined. A function of a module need not be performed on a single machine. Instead, the function may be distributed across system 100 or a wider network, if desired.

Memory device 112 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks, magneto-optical disks, and Compact Disc Read-Only Memory (CD-ROM).

In one implementation, computer system 101 is coupled to an input device 102 (e.g., keyboard or mouse) and an output device 104 (e.g., monitor or screen). The output device 104 may be used to display the reports generated by the report generating unit 208. In addition, computer system 101 may also include a communications card or device 116 (e.g., a modem and/or a network adapter) for exchanging data with a network 132 using a communications link 130 (e.g., a telephone line, a wireless network link, a wired network link, or a cable network). Other support circuits, such as a cache, power supply, clock circuits and a communications bus, may also be included in computer system 101. In addition, any of the foregoing may be supplemented by, or incorporated in, application-specific integrated circuits.

Computer system 101 may operate in a networked environment using logical connections to one or more remote client systems 140 over one or more intermediate networks 132. These networks 132 generally represent any protocols, adapters, components, and other general infrastructure associated with wired and/or wireless communications networks. Such networks 132 may be global, regional, local, and/or personal in scope and nature, as appropriate in different implementations.

Remote client system 140 may be a personal computer, a mobile device, a personal digital assistant (PDA), a server, a server pool, a router, a network PC, a peer device or other common network node, and typically includes many or all of the elements described above relative to computer system 101. Client system 140 may also include one or more instances of computer readable storage media or memory devices (not shown). The computer readable storage media may include a client application suitable for interacting with the components (122, 124) over the network 132. The client application may be an internet browser, a thin client or any other suitable applications. Examples of such interactions include requests for reports. In turn, the client application may forward these requests to the computer system 101 for execution.

Figure 2:
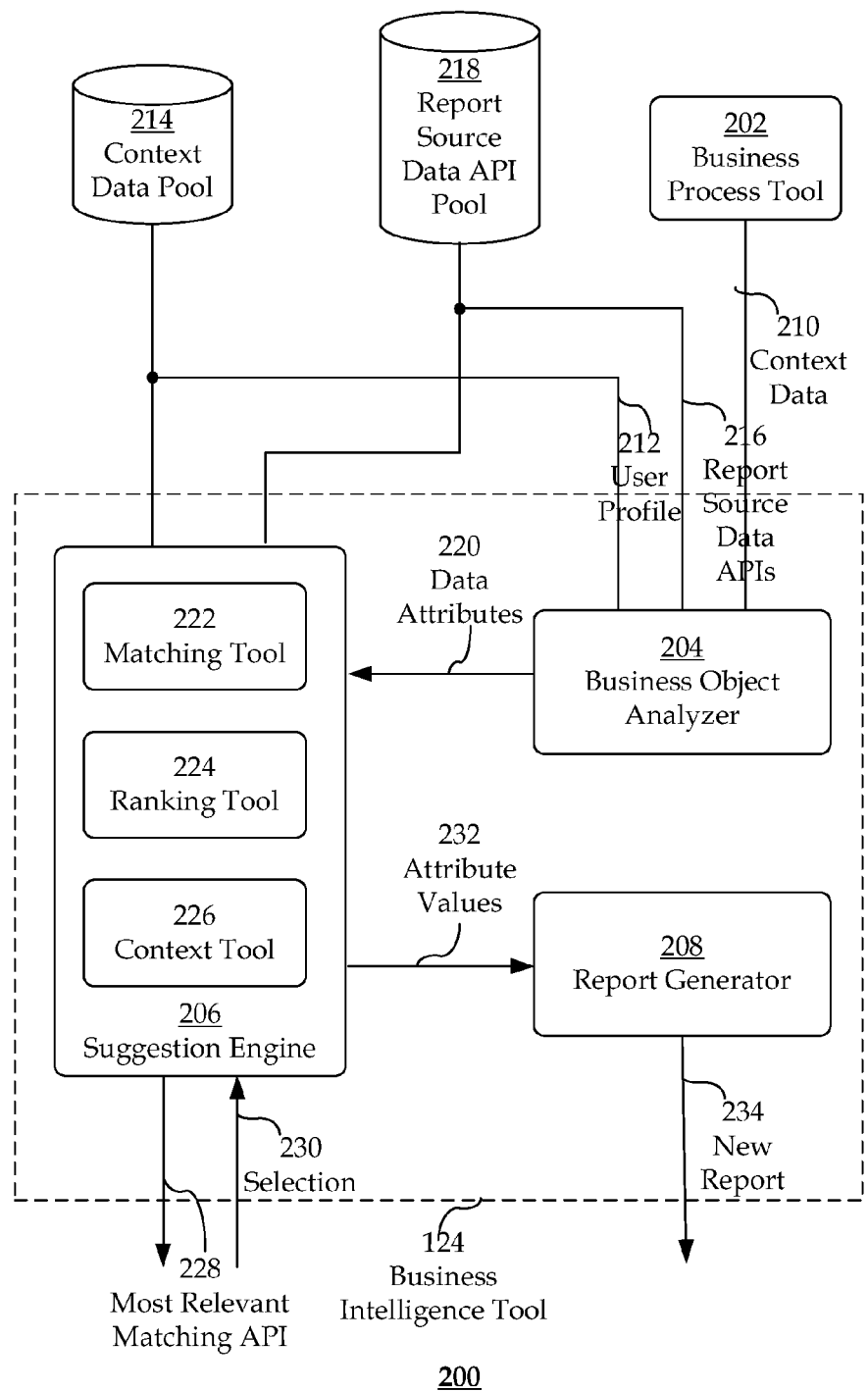
FIG. 2 illustrates various components of an exemplary process-driven business intelligence architecture.

FIG. 2 illustrates various components of an exemplary process-driven business intelligence architecture 200. It should be noted that one or more of these components may also be hosted by different computer systems in some implementations.

In one implementation, the architecture 200 comprises a business intelligence tool 124 communicatively coupled with a business process tool 202. The business process tool 202 performs one or more tasks of a business process. Exemplary business processes include, for example, an enterprise resource planning (ERP) business process such as a human resources (HR) management business process, a sales business process, a project management business process or any type of workflow. As the business process executes, context data may be generated, created, received, exchanged, stored, passed or acted upon by the business process tool 202. For example, the business process tool 202 may be assigned a task to perform, and the task may be uniquely identified by a task ID, which is used to instantiate a business object. Business objects define and enable the tasks to be carried out in the business process. In one implementation, a business object describes an entity to appear in a report. For example, in this case, a business object may describe a given user by storing attributes (e.g., USER ID, DEPARTMENT, POSITION, STATUS, etc.) associated with the user.

As illustrated by FIG. 2, the business intelligence tool 124 may include a business object analyzer 204, a suggestion engine 206 and a report generator 208. In one implementation, the business object analyzer 204 receives context data 210 from the business process tool 202. Context data 210 generally refers to any data that context can be extracted from. Such context data 210 includes, but is not limited to, business objects with associated attributes, user profiles, system information (e.g., time, date), company profile, user history, application data, etc. The term "context" as used herein generally refers to any information that is collected, known, stored, determined, received, or otherwise identified to be associated with the current business process and/or the user associated with the current task in the business process. In particular, such information may be associated with the user's profile, the user's role in a business, the user's geographical location, business, organization, customer, application, workflow, task status, product information, business activity, process or data involved therein, and so forth.

In one implementation, the business intelligence tool 124 extracts context information from the context data 210 while the user is using the business process tool 202. The business intelligence tool 124 may use the extracted context information to intelligently search, match the context and dynamically invoke Application Programming Interfaces (APIs) to provide relevant business intelligence to the user. In one implementation, the business object analyzer 204 receives the context data 210 and records the business object attributes and the user profile 212 in a context data pool 214. The business object analyzer 204 may also retrieve related report source data APIs 216 and store them in a report source data API pool 218. The context data pool 214 and the report source data API pool 218 are databases that enable the respective data to be stored, accessed and retrieved. The data pools (214, 218) may be stored locally on computer system 101 or remotely in another computer system.

The report source data APIs are software interfaces that provide business intelligence by facilitating the retrieval of source data from one or more information sources to generate a report based on the source data. For example, the report source data API "List production plan" may provide a set of functions to retrieve production plans from one or more information sources. It is understood that other types of APIs, including non-report source data APIs, may also be provided. For example, such APIs may be provided to retrieve user data (e.g., user name, department, role, profile, etc.), retrieve data associated with issues occurring within a timeframe (e.g., issue id, name, priority, status, etc.), retrieve data related to a business process task, etc. The data retrieved by such APIs may be analyzed to generate reports or to provide business intelligence. The APIs may be registered during an initial configuration of the computer system 101. In addition, the APIs may be standard APIs pre-defined in the system 101, or customized by the user or another third party.

In one implementation, the suggestion engine 206 receives, from the business object analyzer 204, API input parameters with data attributes 220. Alternatively, the suggestion engine 206 may retrieve these API input parameters 216 with the data attributes 212 directly from the data pools (214, 218). In one implementation, the suggestion engine 206 comprises a matching tool 222, a ranking tool 224 and a context tool 226. More details of these tools will be provided later.

During the business process, the user may request for information while performing certain tasks. After the user enters a request for information, the suggestion engine 206 extracts the current attributes from the request and matches the current attributes with API input parameters. In one implementation, the suggestion engine 206 presents a list of available matching APIs 228 to the user for selection 230. The user may be prompted, via a user interface, to make a selection. It is to be noted, however, that this step is merely optional, and may be useful where many matching APIs are found by the suggestion engine 206. Alternatively, the suggestion engine 206 may select the most relevant matching API 228 with the highest match score, and directly invoke the API based on attribute values 232 to generate a new report 234. The attribute values 232 may be automatically or semi-automatically computed by the suggestion engine 206, and passed to the report generator 208 as API input parameters.

Finally, the report may be presented to the user. The report may be presented to the user via, for example, a graphical user interface. For example, the report may be presented via a pop-up window or a dashboard. The format of the report may include one or more data tables, histograms, pie charts, graphs, text boxes, figures, and so forth.

Exemplary Scenario

Figure 3A:
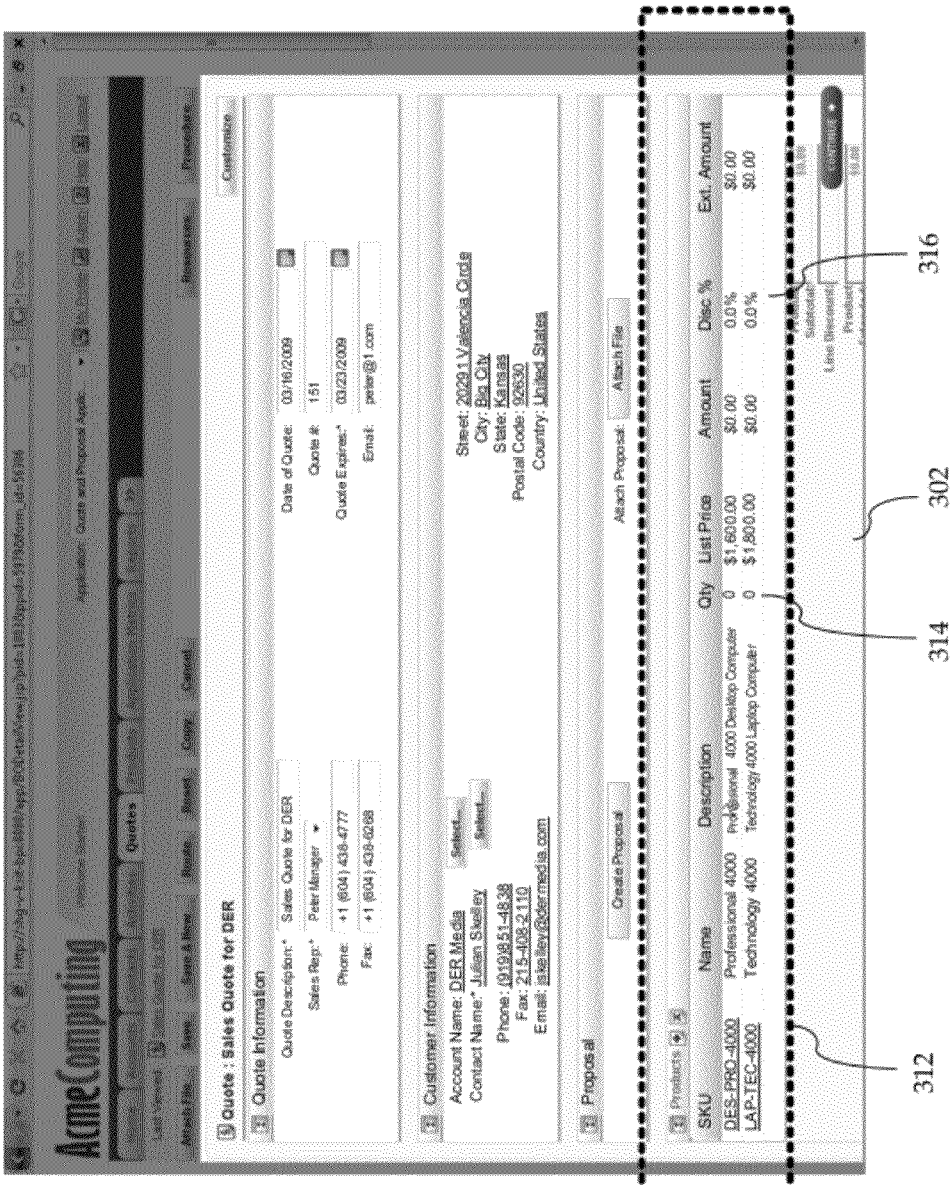
FIGS. 3a-b illustrate an exemplary scenario in accordance with one implementation of the present framework.
Figure 3B:
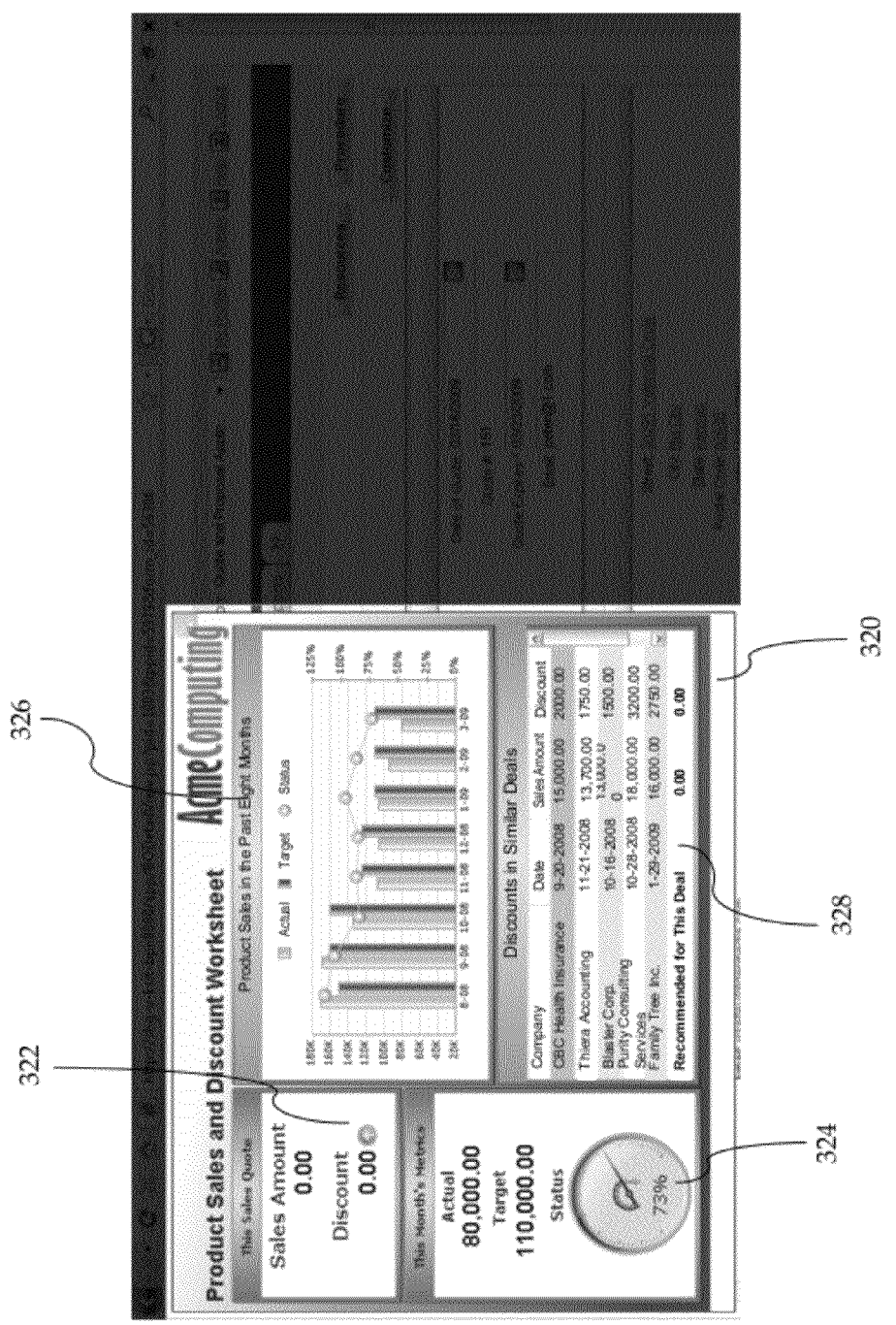

FIGS. 3a-b illustrate an exemplary scenario in accordance with one implementation of the present framework. It is understood that this scenario is provided for purposes of illustration only, and is not intended to limit implementations of the present framework.

In this exemplary scenario, a sales executive wishes to generate a sales quote for a customer who is interested in buying 10 desktop computers and 10 laptop computers. FIG. 3a shows a screenshot of an exemplary window 302 that is displayed by the ERP software. Since the desktop and laptop computers are part of the product portfolio, the user may click on the Products section 312 to change the quantity 314 or discount 316 fields. The selection of the Product section 312 indicates a change in business context. Upon receiving the user selection, the present framework extracts the context from the current attribute values associated with the Products section 312 and dynamically loads relevant business intelligence APIs specific to the product sales context.

FIG. 3b shows an exemplary pop-up window 320 that presents the results of the appropriate BI analytics. For example, the pop-up window 320 may include an indicator 322 that shows how likely the discount will be approved by the same manager, metrics 324 indicating sales performance, sales trend 326, or discounts in similar deals 328. If the user makes any changes to the sales quote presented via a dashboard (or window) 302, as shown in FIG. 3a. Such changes are pushed to the BI analytics directly, and the dashboard 320 presents the updated results.

As illustrated by the exemplary scenario shown by FIGS. 3a-b, the user can advantageously obtain valuable information from automatically generated reports without spending effort on report development. This approach also offers seamless, interactive and native integration of BI analytics (e.g., report generation) with the business process. During the work process, the user may obtain answers to questions without having to leave the work environment and to search for such information in another application. In addition, instead of having to search for information or pull data from different information sources, valuable data is automatically pushed and suggested to the user by the present framework. In a collaborative environment, for example, the manager can sign-off at each stage of the business process and make important enterprise decisions based on the automatically generated reports. While the manager or user navigates the workspace, changes in business context cause relevant BI analytics to be loaded, and context-based reports to be generated and presented to the user.

Exemplary Method

Figure 4:
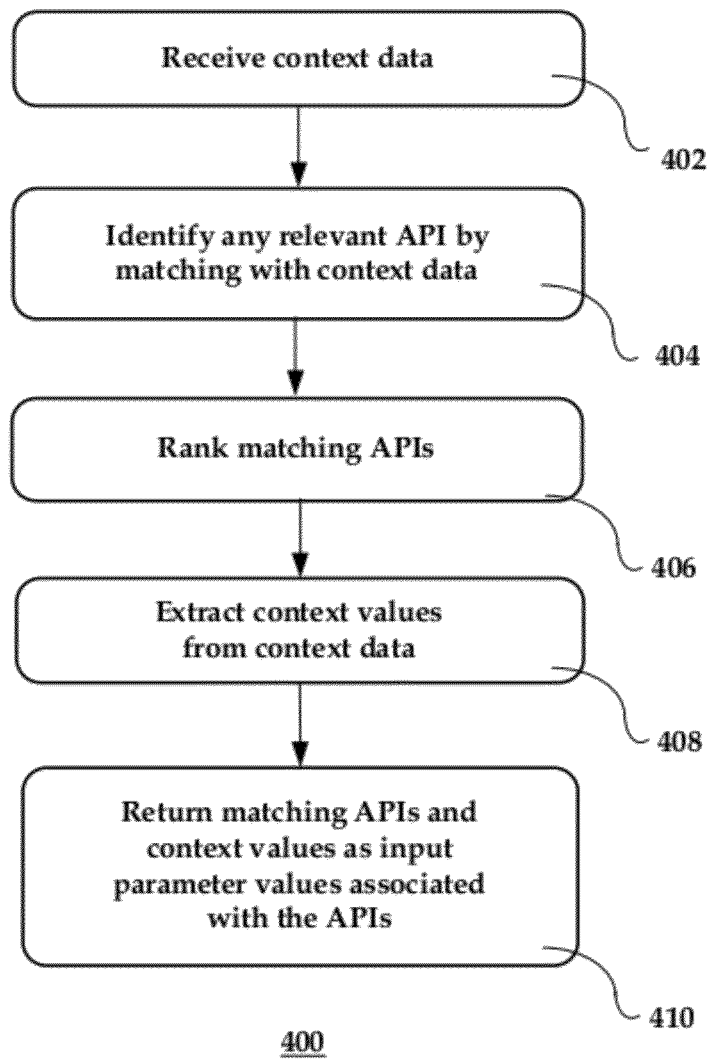
FIG. 4 shows an exemplary method.

FIG. 4 shows a method 400 in accordance with one implementation of the present framework. The method 400 may be implemented by, for example, the suggestion engine 206 as described in relation to FIG. 2. It should be noted that in the following discussion, reference will be made, using like numerals, to the features described in FIGS. 1 and 2.

Referring to FIG. 4, at 402, context data is received. The context data may be generated by a business process, such as an ERP business process or workflow. Such context data may be retrieved by the suggestion engine 206 from the context data pool 214, as described previously. The context data includes, for example, one or more business objects, user profiles, system information, company profiles, user histories, application data, and so forth. Other types of context data from which context may be derived may also be provided.

At 404, the matching tool 222 identifies one or more APIs that are relevant to the current context. Relevant APIs may be identified by matching the APIs with the current attributes of the context data. In one implementation, the APIs include report source data APIs that are executable to retrieve data from various information sources and automatically generate reports based on such data. Other types of APIs may also be provided. The APIs may be retrieved from, for example, the report source data API pool 218, as described previously.

One or more methods may be used to perform the matching calculation. In one implementation, a name matching method is used to identify any API with one or more parameter names that match a current attribute name associated with the context data. In another implementation, an alias matching method is used to identify any API with parameter names that match an alias of a name associated with the current attribute. In yet another implementation, a value matching method is used to identify APIs with parameter names that match semantic values of current context attributes. These matching methods will be described in more detail later. Alternatively, or in combination thereof, the matching method may also be defined by the user.

At 406, the ranking tool 224 ranks the matching APIs and presents the ranked APIs in a suggestion list to the user. In one implementation, the ranking is based on scores computed by one or more ranking methods. The ranking methods may be pre-defined by the system, or manually defined by the user, as will be described in more detail later. Alternatively, or in combination thereof, the ranking method may compute recommendation scores based on historical statistics, as will also be described in more detail later. The final score of each report source may be the accumulation of scores obtained by the various ranking methods.

At 408, the context tool 226 extracts one or more context values from the context data. The context values may be used as input values of parameters for the APIs. The context values may be presented to the user for selection via, for example, a graphical user interface. The context values may be extracted from, for example, the user profile or system information (e.g., time, date) that provides additional information about the user or the user's business. Such context values facilitate the retrieval of data that is likely to be relevant to the user's interest.

At 410, the suggestion engine 206 returns a list of one or more matching APIs and their corresponding input parameter values. The input parameter values are derived from the context values extracted from the context data. The list of APIs may be stored in a hierarchical structure, which is ranked at each level. Other types of data structures may also be used. The list may be presented to the user for selecting the appropriate API. Alternatively, the system may automatically select and pass one or more APIs to, for example, a report generator 208 to generate the context-based reports.

Matching Calculation

Figure 5:
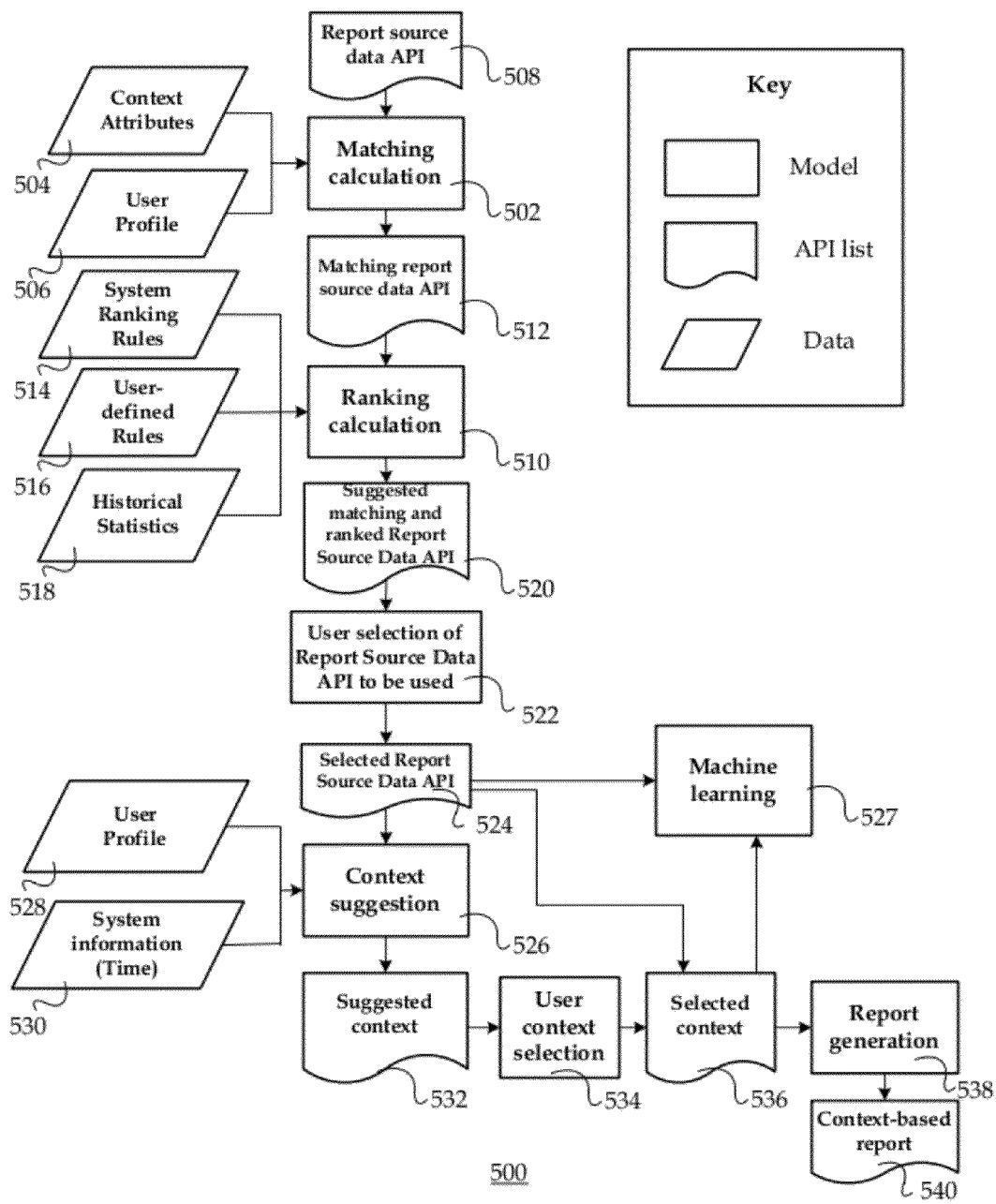
FIG. 5 shows an exemplary schema.

FIG. 5 shows an exemplary schema 500 in accordance with one implementation. The exemplary schema 500 illustrates a process-driven report generation method. The schema 500 may be implemented by, for example, the suggestion engine 206 as described in relation to FIG. 2. It should be noted that in the following discussion, reference will be made, using like numerals, to the features described in FIGS. 1 and 2.

In one implementation, the matching tool 222 in the suggestion engine 206 implements a matching calculation model 502. The matching calculation model 502 uses one or more matching methods (or strategies) to identify one or more report source data APIs that are relevant to the current context or user's interest, based on one or more context attributes 504 and/or a user profile 506. The APIs may be selected from an input list 508 of available APIs. A result list 512 of matching report source data APIs is generated by the selection process. In one implementation, the result list 512 is the union of all the report source data APIs selected by the matching methods. In addition, security constraints may be imposed in generating the result list 512. For example, if a user does not have the privilege or permission to view the information from a particular report source, the corresponding report source data API will be removed from the result list 512.

Figure 6A:
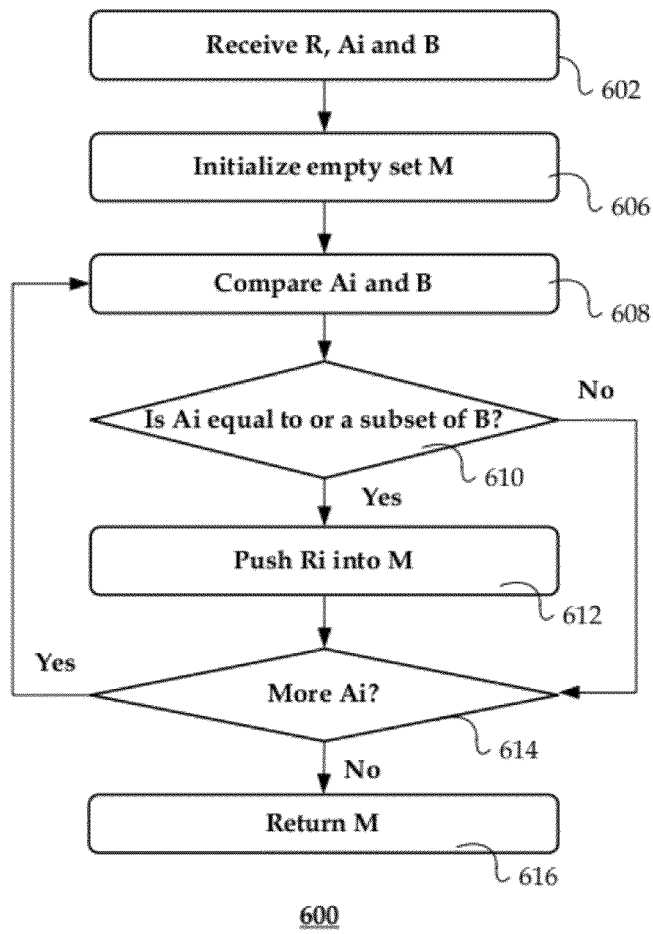
FIG. 6a shows an exemplary name matching method.

In one implementation, the matching method comprises a name matching method. FIG. 6a shows an exemplary name matching method 600. Generally, the matching method 600 describes the matching tool 222 identifying a set of one or more report source APIs with parameter names that match a set of one or more current context attribute names.

At step 602, the matching tool 222 receives input data 604. In one implementation, the input data 604 comprises a set of report source data API names (R). A report source data API comprises one or more functions to retrieve various types of information from various report sources. Examples of report source APIs include "List production name," "List leave requests," "List employee salaries," "List department employees," and so forth. Each report source API name (Ri) is associated with a set of one or more input parameters (Ai). For example, the "List production plan" API may be associated with the input parameters DEPARTMENT and TIMEFRAME, which identify the department and period of time for which the production plans are to be listed. Other types of input parameters may also be defined. The input data 604 may further include a set of current context attribute names (B). The current context attributes and values may be derived from the context data (e.g., business objects). Examples of context attributes include, but are not limited to, USER_ID, DEPARTMENT, ORGANIZATION, TIMEFRAME and POSITION. It is understood that other types of context attributes may also be provided.

At step 606, an empty result set (M) is initialized. At 608, the parameter name set (Ai) associated with each report source data API name (Ri) are compared. At 610, if the report source data API's parameter name set (Ai) is contained (i.e. equal to or a subset of) in the context attribute name set (B), then the report source data API name (Ri) is "matching". At 612, the report source data API name (Ri) is stored or pushed into the result set (M). At 614, the matching tool 222 checks to see if there are any remaining parameter name sets (Ai) to be processed. If there are parameter name sets (Ai) to be processed, steps 608, 610, 612 and 614 are repeated. If the parameter name set (Ai) is not contained in the context attribute name set (B), the next parameter name set (Ai), if any, is processed at 608. At 616, the result set of matching report source API names 618 is returned.

FIG. 6b shows examples of the input data 604 and output data 618 generated by a name matching method. As shown, the exemplary result list M does not include "List leave requests" (R2), because the input parameter "LEVEL" (in A2) is not contained in the context attribute name set B. Similarly, the API name "List department employees" is not part of the result set M, because its corresponding input parameter "YEAR" (in A4) does not belong to the context attribute name set B.

In another implementation, the matching method comprises an alias matching method. The alias matching method is generally an extension of the name matching method 600, which was previously described. However, instead of simply matching the names of the current context attributes and API parameters, the alias matching method compares the aliases of the context attribute names with the API parameter names. An alias generally refers to an alternate name (e.g., synonym, acronym, etc.) that is used to identify the same context attribute. Each name may be associated with one or more aliases. For example, the context attribute name "USER_ID" may be associated with the aliases "ID," "Identity," and "EMPLOYEE_IDENTITY." The alias matching method expands the set of context attribute names by adding the one or more aliases associated with the context attribute names to the comparison set. The aliases may be pre-defined and stored in, for example, a dictionary. The aliases may also be manually added by users into the dictionary.

Figure 7A:
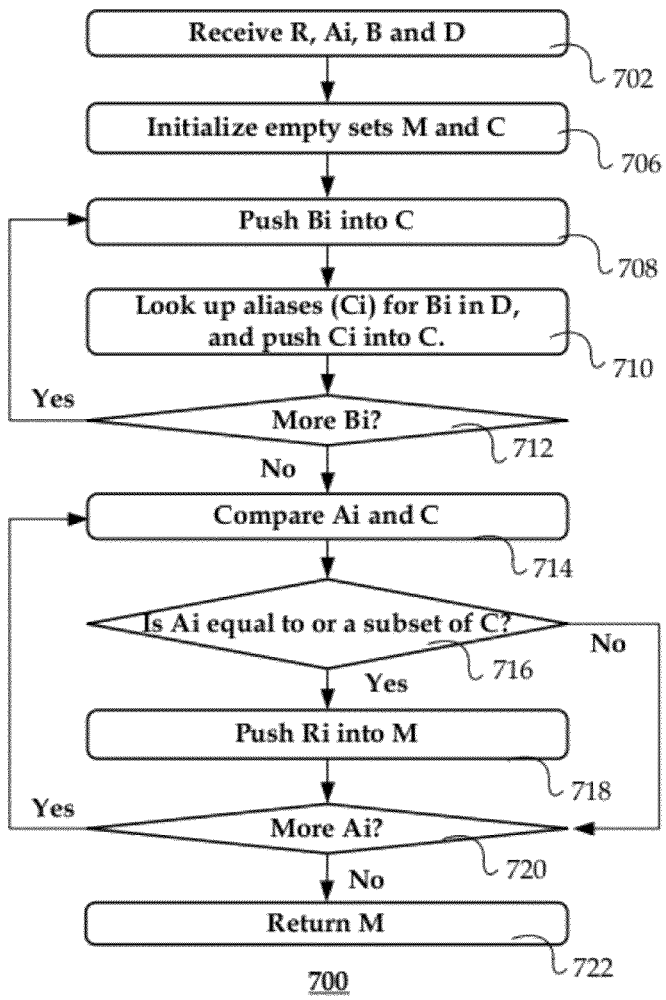
FIG. 7a illustrates an exemplary alias matching method.

FIG. 7a illustrates an exemplary alias matching method 700 in more detail. At 702, the matching tool 222 receives input data 704. In one implementation, the input data 704 comprises a set of report source data API names (R), wherein each report source data API name (Ri) is associated with a set of one or more API parameter names (Ai). The input data may further include a set of current context attribute names (B) and a dictionary of aliases (D). An exemplary dictionary (D) is shown in FIG. 7b. As shown, the dictionary (D) comprises a table 705 indexed by keys that are potential context attribute names. It is understood that other types of data structures may also be provided. The table 705 maps each key to one or more aliases. For example, the key "USER_ID" is mapped to the aliases "ID," "Identity," "USER_NUMBER" and "EMPLOYEE_ID."

Turning back to FIG. 7a, at 706, the matching tool 222 initializes result set M and alias name set C as empty sets. Alias name set C serves to store all the context attribute names and aliases corresponding to the context attribute names. Result set M is used to store the result set of matching report source API names identified by the method 700. At 708, the matching tool 222 parses the context attribute name set B. For each element Bi in the context attribute name set B, the matching tool 222 pushes (or saves) Bi in the set C. Next, at 710, using the context attribute name Bi as the key, the matching tool 222 looks up the dictionary (D) for any aliases (Ci). The aliases Ci may be saved in the set C. At 712, the matching tool 222 checks to see if there are any other context attribute names (Bi) to be processed. If yes, the steps 708, 710 and 712 are repeated. If all the context attribute names Bi have been processed, the process continues to step 714.

At 714, the matching tool 222 compares the API parameter name set (Ai) corresponding to each API name (Ri) with the alias name set (C). At 716, if the API parameter name set (Ai) is equal to or a subset of alias name set (C), then a match is deemed to be found. At 718, the API name (Ri) corresponding to Ai is pushed (or stored) into result set M. At 720, if there are remaining API parameter name sets (Ai) to be processed, the steps 714, 716, 718 and 720 are repeated. If there are no remaining Ai to be processed, the matching tool 222 returns the result set M at 722.

FIG. 7b shows an exemplary set of input data 704 and corresponding output data 724 that may be generated by the method 700. As shown, the result set M does not include the API name "List leave requests" (R2) because the API's parameter name "LEVEL" is not a context attribute name or an alias of any context attribute name. Similarly, the API name "List department employees" (R4) is also not in the result set M, because the API's parameter name "YEAR" is neither a context attribute name nor an alias of any context attribute name.

Another exemplary matching method is the value matching method. This method generally includes analyzing and extracting semantics from current context attribute values, and matching the attribute value semantics with the report source data API parameter names. For example, a context attribute may have a meaningless name "XYZ," which is associated with a current value of "China." The matching-by-value method analyzes the text of the context attribute value "China" as "Country," and uses "Country" (instead of the meaningless "XYZ") to match the report source data API parameter names. This approach may be used to complement or replace the name matching method and/or alias matching method described previously, as it may be more accurate in some cases.

Figure 8:
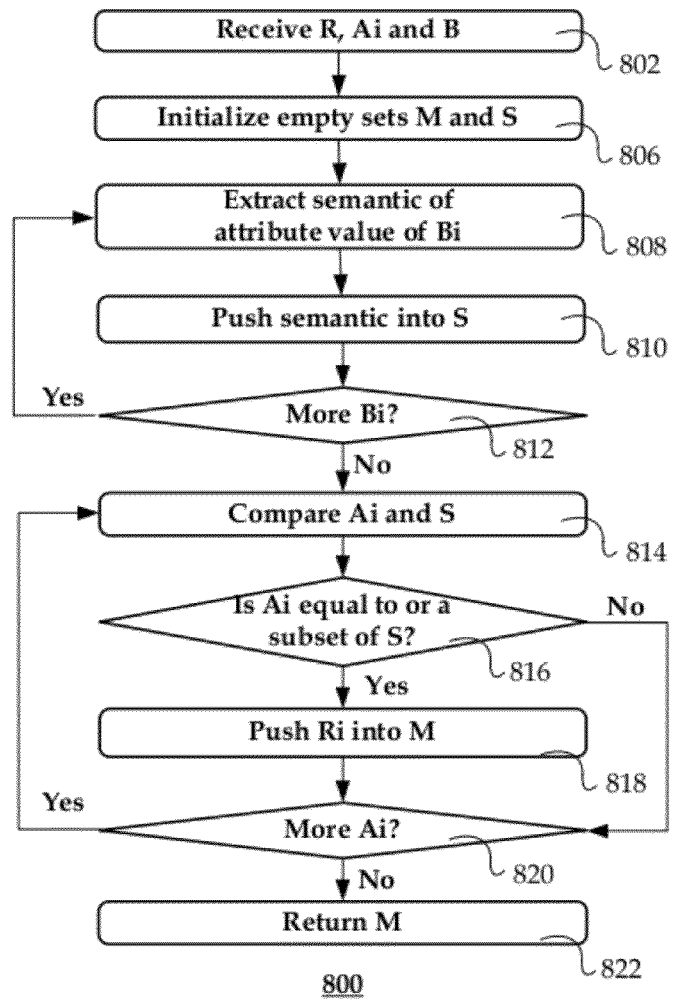
FIG. 8 shows an exemplary value matching method.

FIG. 8 shows an exemplary value matching method 800 in more detail. At 802, the matching tool 222 receives the input data 804. In particular, the input data 804 may include a set of report source data API names (R), a set of API parameter names (Ai) for each API name Ri, and a set of context attribute names (B). At 806, result set M and semantic set S are initialized as empty sets. The semantic set S may be used to store semantic values that are extracted (or derived) from the values of the context attributes (B).

At 808, the matching tool 222 extracts the semantic of the value of the context attributes Bi. The semantic extraction may be performed by, for example, a data analyzing tool. The data analyzing tool may implement artificial intelligence techniques to determine the semantic meaning of a given data string. At 810, the semantic is pushed (or stored) into semantic set S. At 812, the matching tool 222 checks to see if there are any other context attributes Bi to be processed. If there are remaining context attributes Bi, the steps 808, 810 and 812 are repeated. If not, the method continues at step 814.

At 814, the matching tool 222 compares Ai and the semantic set S. At 816, if Ai is equal to or a subset of S, then the corresponding Ri is pushed (or stored) into the result set M. Steps 814, 816 and 820 are repeated for all the remaining Ai. At 822, the matching tool 222 returns the result set M, which includes all the matching report source API names identified by the method 800.

Ranking Calculation

Turning back to FIG. 5, the result list 512 generated by the matching tool 222 is passed to a ranking tool 224 to implement a ranking calculation model 510. In one implementation, the ranking calculation model 510 ranks the report source data APIs in the result list 512 according to their match scores. The match scores may be computed by one or more ranking methods. Such ranking methods compute the match scores according to, for example, pre-defined system ranking rules 514, user-defined rules 516, historical statistics 518, or a combination thereof. To compute the final score for each API, the scores generated by the various ranking methods may be accumulated.

In one implementation, the ranking calculation model 510 comprises a system-defined ranking method. A system-defined ranking method computes ranking scores according to rules that are pre-defined and stored in the system. Such system-defined ranking method may be selected as the default ranking method. In one implementation, the system-defined ranking method ranks a report source data API according to its specificity of match (i.e. number of input parameters associated with the matching API). For example, the more specific the match is, the higher the score assigned to the matching API.

Figure 9A:
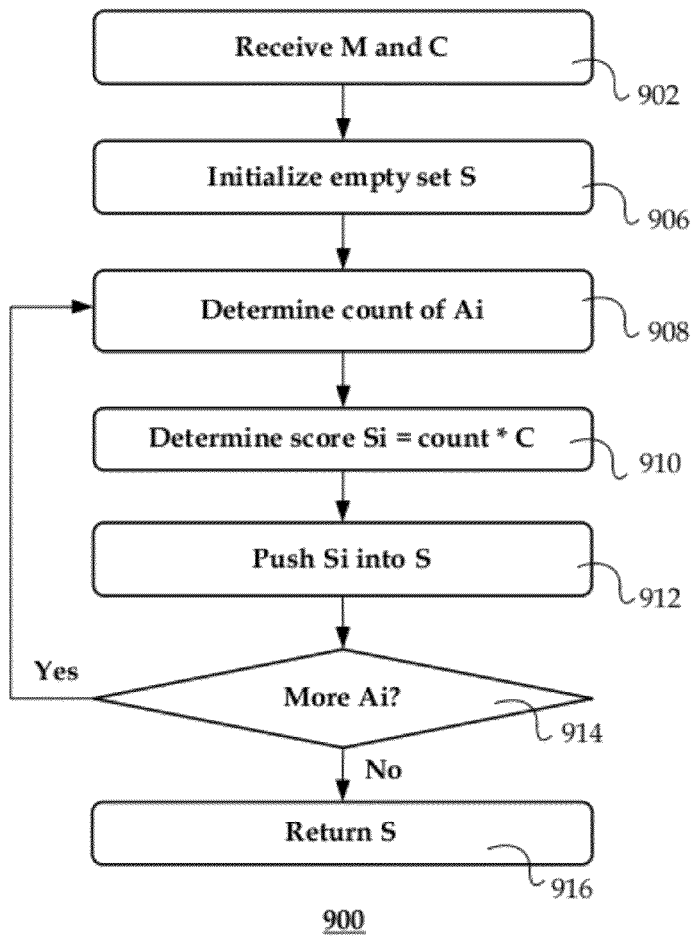
FIG. 9a illustrates an exemplary system-defined ranking method.

FIG. 9a illustrates an exemplary system-defined ranking method 900 in more detail. At 902, the ranking tool 224 receives input data 904. The input data 904 comprises a set M of matching report source APIs and a score of specificity C. The matching set M may be generated by the matching tool 222, as previously described. Each element Mi in the matching set M corresponds to a set Ai of one or more parameter names. The score of specificity C is a predetermined constant value. One or more constant scores may be provided for an API. In one implementation, multiple scores Ci are assigned to an API with multiple parameters (e.g., DEPARTMENT, COMPANY, USER_ID, etc.). Each parameter of the API may be individually assigned a score. For example, the set of scores Ci for an API may be {DEPARTMENT: 10; COMPANY: 9; USER_ID: 8; ...}.

At 906, the score set S is initialized as an empty set. The score set S is used to store score values computed by the method 900. In one implementation, each element Si in the score set S stores a score for a corresponding matching report source data API Mi.

At 908, the ranking tool 224 determines the count of parameters corresponding to each matching report source data API Mi listed in M. In particular, the ranking tool determines the number of elements in each parameter set Ai associated with API Mi. As discussed previously, a matching API with a higher number of parameters provides more specificity and will therefore be allocated a higher score.

At 910, the ranking tool 224 determines the score Si. In one implementation, the score Si is determined by multiplying the count by the specificity C. Once the score Si is computed, it may be saved or pushed into the set S at 912. At 914, the ranking tool 224 checks to see if there are further parameter sets Ai to be processed. If so, the steps 908, 910, 912 and 914 are repeated. If all parameter sets Ai are already processed, the ranking tool 224 returns the set S at 916.

FIG. 9b shows an exemplary input data 904 and exemplary output data 918 generated by a system-defined ranking method. As illustrated in table 905, the report sources are ranked by the respective scores. The matching report source data API "List leave requests" has the highest score because it is associated with the most number of parameter names (i.e. 3). FIG. 9c shows an exemplary order list 930. The order list 930 includes the names of matching report source data APIs ranked according to their scores.

In another implementation, the ranking method comprises a user-defined method. A user-defined method computes ranking scores according to user-defined rules. One exemplary user-defined method includes assigning a very high score to a certain report source API such that it is always the highest ranked in the suggestion list. For example, users can define a MAX score for the API "List production plan" if the current context attributes are "USER_ID, DEPARTMENT, TIMEFRAME, POSITION, PRODUCTION."

In accordance with another implementation, the ranking method comprises a historical user selection method. The historical user selection method is based on historical statistics compiled from recording users' previous selections. Such historical statistics may be used in artificial intelligence algorithms, such as machine learning, data mining or statistical classification (e.g., Bayesian model), to provide "recommendation scores."

Context Suggestion

Turning back to FIG. 5, at 522, the user selects, from a suggestion list 520 of matching and ranked report source data API, one or more APIs to be used for retrieving data. The user may be prompted to make such selection via, for example, a graphical user interface. The user selection 524 is passed to the context suggestion model 526. In one implementation, the context suggestion model 526 is implemented by the context tool 226, described with respect to FIG. 2. The context suggestion model 526 provides suggestions of context values 532 for the input parameters of the selected APIs 524. The context values may be derived from information such as the user profile 528, system information 530, or any other types of information associated with the user or the business process. For example, when a user inputs the text string "Wall Street," the context suggestion model 526 may provide a suggestion to the user, such as "Do you mean New York, Wall Street?"

A suggestion list of context values 532 may be presented to the user for selection at 534. Alternatively, or in combination thereof, the framework may implement a machine learning model 527 that automatically selects context values based on historical statistics. The historical statistics may be compiled by storing prior user selections of context values or report source data APIs. With the selected context values 536, the selected APIs 524 may be executed by the report generation model 538 to present context-based reports 540 that are tailored to the user's interest.

As discussed previously, the suggested context values 532 may be extracted from the user profile 528. The user profile 528 may be stored as an attribute of a business object. The user profile 528 provides information about the current user, which may be useful in determining what kind of data the user may be interested in viewing. Based on this determination, the present framework may suggest the specific type of information the current user is likely to be interested in. In one implementation, the user profile 528 comprises attributes related to the role, location, or organization of the user, or a combination thereof. It is understood that other types of attributes may also be provided.

More particularly, users in different roles (or positions) are interested in different types of information. For example, if the attribute "ROLE" is associated with a "CFO" value, the context value "Financial" is suggested as the value of "ReportType" in context. As a result, financial reports may be pushed to the CFO user. Users in different locations or organizations (or departments) may also be interested in different sets of information. In addition, a user may be interested in data related not only to their own geographical location or organization, but also data related to their neighbor's, co-worker's or competitor's location or organization. The rules for mapping the attribute to the suggested context value 532 may be stored in a system metadata repository, such as SAP BusinessObjects text analysis. Other types of repositories are also useful.

FIG. 10 shows exemplary current context attributes 1002 and parameter values suggested for respective report source data APIs 1006, 1010 and 1016. The current context attributes 1002 show that the user is a Manager located in the Shanghai Sales Office. Based on these attribute values, the context tool 226 may suggest "Beijing Sales Office" and "China Office" as context values for the input parameter "DEPARTMENT" associated with the report source data API "List production plan" 1006.

The suggested context values may also be extracted based on system information 530. System information 530 includes, for example, the current time. The system information 530 may also be stored as an attribute of a business object. Information, such as current year, current quarter, current month, etc., may be derived from the current time. In addition, the context tool 226 may generate time-sensitive alerts from such system information.

For example, referring to FIG. 10, the current context attributes 1002 show that the attribute "TIMEFRAME" has the value of "Sep. 24, 2009." The context tool 226 may determine that this timeframe is close to the end of the third quarter of 2009 and suggest the context value of "2009 Q3" for the input parameter "TIMEFRAME" for report source data API "List production plan" 1006. As a result, the data of the current quarter Q3 may be pushed to the user upon executing the report source data API. Data in other types of timeframes, such as hourly, daily or monthly data, may also be pushed to the user.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method, comprising:
   receiving context data generated by a business process tool that supports business enterprise planning, wherein the context data includes a user profile that is associated with at least one current attribute related to a role, location or organization of the user;
   identifying a relevant application programming interface (API) by matching one or more input parameters of the API with the current attribute, wherein the API is a software interface executable to perform one or more functions;
   providing one or more suggestions of context values derived at least in part from the user profile;
   executing, by a processor, the identified API using at least one of the context values as an input parameter to retrieve source data from an information source; and
   providing, by the executed API, business intelligence based on the source data within a work environment of the business process tool, wherein the business intelligence supports business enterprise decision-making.

2. The method of claim 1 wherein the business process tool comprises an enterprise resource planning tool.

3. The method of claim 1 wherein the API is executable by the processor to provide business intelligence by generating a report based on the source data and presenting the report within the work environment of the business process tool.

4. The method of claim 1 wherein the API is executable by the processor to provide business intelligence by analyzing the source data and presenting results of the analysis to a user within the work environment of the business process tool.

5. The method of claim 1 wherein the API is executable by the processor to retrieve the source data from a plurality of information sources.

6. The method of claim 1 wherein the context data further comprises a business object, system information, company profile, user history, application data, or a combination thereof.

7. The method of claim 1 wherein the information source comprises a website.

8. The method of claim 1 wherein the identifying the relevant API comprises identifying any API with one or more input parameters that match a name associated with the current attribute, wherein the one or more input parameters identify one or more values used in retrieving the source data from the information source.

9. The method of claim 1 wherein the identifying the relevant API comprises identifying any API with one or more input parameters that match an alias of a name associated with the current attribute, wherein the one or more input parameters identify one or more values used in retrieving the source data from the information source.

10. The method of claim 1 wherein the identifying the relevant API comprises identifying any API with one or more parameter names that match a semantic value associated with the current attribute.

11. The method of claim 1 wherein the identifying the relevant API comprises identifying a plurality of relevant APIs.

12. The method of claim 11 further comprises:
presenting, to a user, a suggestion list of the relevant APIs;
receiving a selection from the user at least one of the relevant APIs; and
invoking the at least one of the relevant APIs to provide business intelligence.

13. The method of claim 12 further comprises:
computing match scores for the relevant APIs; and
ranking the relevant APIs on the suggestion list according to the match scores.

14. The method of claim 13 wherein the computing the match scores comprises computing the match scores according to a system-defined ranking rule.

15. The method of claim 14 wherein the computing the match scores according to the system-defined ranking rule comprises determining the match scores based on specificity of match.

16. The method of claim 13 wherein the computing the match scores comprises computing the match scores according to a user-defined ranking rule.

17. The method of claim 13 wherein the computing the match scores comprises computing the match scores according to historical statistics.

18. The method of claim 1 further comprises:
extracting one or more context values from the context data; and wherein the identified API is executed using the one or more context values as input parameters of the API to retrieve the source data from the information source and provide business intelligence based on the source data.

19. A non-transitory computer readable medium embodying a program of instructions executable by a machine to perform steps for providing business intelligence, the steps comprising:
receiving context data generated by a business process tool that supports business enterprise planning, wherein the context data includes a user profile that is associated with at least one current attribute related to a role, location or organization of the user;
identifying a relevant application programming interface (API) by matching one or more input parameters of the API with the current attribute, wherein the API is a software interface executable to perform one or more functions;
providing one or more suggestions of context values derived at least in part from the user profile;
executing, by the machine, the identified API using at least one of the context values as an input parameter to retrieve source data from an information source; and
providing, by the executed API, business intelligence based on the source data within a work environment of the business process tool, wherein the business intelligence supports business enterprise decision-making.

20. A system comprising:
a memory device for storing computer readable program code; and
a processor in communication with the memory device, the processor being operative with the computer readable program code to:
receive context data generated by a business process tool that supports business enterprise planning, wherein the context data includes a user profile that is associated with at least one current attribute related to a role, location or organization of the user;
identify any relevant application programming interface (API) by matching one or more input parameters of the API with the current attribute, wherein the API is a software interface executable to perform one or more functions;
provide one or more suggestions of context values derived at least in part from the user profile;
execute the identified API by the processor using at least one of the context values as an input parameter to retrieve source data from an information source; and
provide, by the executed API, business intelligence based on the source data within a work environment of the business process tool, wherein the business intelligence supports business enterprise decision-making.

* * * * *